United States Patent
Hanff et al.

(10) Patent No.: US 7,302,840 B2
(45) Date of Patent: Dec. 4, 2007

(54) METHOD AND APPARATUS FOR AERODYNAMIC/HYDRODYNAMIC TESTING OF A MODEL

(75) Inventors: Ernest S. Hanff, Ottawa (CA); Xing Zhong Huang, Ottawa (CA)

(73) Assignee: National Research Council of Canada, Ottawa, Ontario (CA)

( * ) Notice: Subject to any disclaimer, the term of this patent is extended or adjusted under 35 U.S.C. 154(b) by 0 days.

(21) Appl. No.: 11/565,465

(22) Filed: Nov. 30, 2006

(65) Prior Publication Data
US 2007/0186638 A1 Aug. 16, 2007

Related U.S. Application Data

(63) Continuation of application No. 10/493,223, filed as application No. PCT/CA2002/001417 on Sep. 17, 2002, now abandoned.

(60) Provisional application No. 60/330,438, filed on Oct. 22, 2001.

(51) Int. Cl.
*G01M 10/00* (2006.01)
*B63B 9/08* (2006.01)
(52) U.S. Cl. ...................................................... 73/148
(58) Field of Classification Search .................. 73/148
See application file for complete search history.

(56) References Cited
U.S. PATENT DOCUMENTS

| | | | | |
|---|---|---|---|---|
| 1,309,728 A | * | 7/1919 | Grieshaber | 73/148 |
| 1,309,736 A | * | 7/1919 | Hibbs et al. | 73/148 |
| 3,028,688 A | * | 4/1962 | Ebert | 434/392 |
| 3,513,696 A | * | 5/1970 | Blair | 73/148 |
| 4,532,801 A | * | 8/1985 | Coder et al. | 73/866.4 |
| 4,587,841 A | * | 5/1986 | Giovachini et al. | 73/148 |
| 5,205,162 A | * | 4/1993 | Lefebvre et al. | 73/148 |
| 5,369,992 A | * | 12/1994 | Meng | 73/148 |
| 6,029,519 A | * | 2/2000 | Kuklinski | 73/570.5 |

FOREIGN PATENT DOCUMENTS

WO    WO 01/20978 A1 * 3/2001

* cited by examiner

*Primary Examiner*—Michael Cygan
(74) *Attorney, Agent, or Firm*—Anne Kinsman; Borden Ladner Gervais LLP (57) ABSTRACT

An aerodynamic or hydrodynamic test apparatus that permits all air to be evacuated from the test enclosure, such that no free liquid surfaces remain. This permits more accurate testing of structures, particularly at low Reynolds numbers. The apparatus includes a seal that allows the elimination of a liquid free surface. The seal is disposed in a slit on an upper surface of the enclosure and can include one or more inflatable sealing members. The upper surface of the enclosure is preferably sloped upwardly towards the seal to prevent the entrapment of air bubbles within the enclosure. A method of testing using such an apparatus is also disclosed.

18 Claims, 10 Drawing Sheets

METHOD AND APPARATUS FOR AERODYNAMIC/HYDRODYNAMIC TESTING OF A MODEL

CROSS REFERENCE TO RELATED APPLICATIONS

This application is a continuation of application Ser. No. 10/493,223, filed Oct. 22, 2004, now abandoned, which claimed priority from U.S. Provisional Application No. 60/330,438, filed Oct. 22, 2001.

FIELD OF THE INVENTION

The invention relates to the field of aerodynamic and hydrodynamic testing, and more particularly to a method and apparatus for such testing at low Reynolds numbers.

BACKGROUND OF THE INVENTION

The traditional approach to aerodynamic testing consists of installing a suitable model of a configuration under study in a wind tunnel and forcing air around it. In the presence of the flow, a variety of physical quantities such as forces, moments, and pressures acting on the model are measured. As well, properties of the flow around the model, such as local velocity, are observed by means of flow visualization and diagnostic techniques.

A frequently used alternate aerodynamic testing approach is based on the use of a water-tunnel. A water tunnel generally consists of an open channel through which water flows. The model is submerged in the water tunnel, resulting in a situation similar to a wind tunnel except that, in addition to the difference in test medium, the test medium has a free surface at its top surface.

A traditional tow tank can also be used in aerodynamic and hydrodynamic testing. Such tow tanks, known to someone skilled in the art, usually consist of a water channel containing a stationary liquid, in which a model is either submerged or floating on the surface, depending on the test being performed. A trolley system is set up over the channel and pulls the model through the channel, thereby imparting movement to the model. A less common towing tank is described in U.S. Pat. No. 4,587,841 to Giovachini et al. This towing tank can be used in hydrodynamic testing. The model floats or is submerged in water contained inside an elongated basin, and is supported by a mechanism within the tank that imparts the required motion. Giovachini et al. discloses a submerged frame, equipped with rollers and a motor, which is attached to the bottom of the tank. The model travels along the tracks at the desired velocity. Towing tanks, like water tunnels, also have a free top surface.

The free surface, present in both water tunnels and towing tanks, causes undesirable waves, turbulence, and other disturbances in the surface of the medium. These disturbances can cause changes in the pressure distribution within the tank, thereby altering the flow and affecting other measurements. External factors, such as vibration due to vehicular traffic, as well as the movement of the model itself, can also adversely affect the conditions in a tank or tunnel with a free surface. To minimize the aforementioned effects, conventional towing tanks filled with water are made sufficiently deep so as to allow positioning of the model far from the free surface.

In order to have a higher degree of control over the experimental conditions and avoid the problems associated with free surface disturbances, it is desirable to have a closed channel with no free surface. Such an apparatus would have the additional benefit of requiring less test fluid, an important consideration when dealing with costly liquids. The testing tank described in JP 11-344415 to Toyama et al. is capable of being converted from an open channel to a closed channel, by attaching a lid to the apparatus. However, once the channel is closed, there is no mechanism to impart movement to the submerged model, and free surfaces may still be present.

The disadvantages of conventional wind and water aerodynamic testing apparatus become even more apparent when it is desired to test at low Reynolds number flows. The Reynolds number is proportional to the ratio of the inertial forces and the viscous forces affecting the model. Testing at low Reynolds numbers is particularly important to support fundamental research, as well as the development of vehicles operating in such a flow regime, such as Micro Air Vehicles (MAV), high-altitude, long-endurance (HALE) vehicles, etc.

The experimental determination of airloads at low Reynolds number flows is extremely difficult with conventional apparatus, because the generated loads are so low as to be virtually immeasurable with an acceptable accuracy. Furthermore, the small size of the models required to carry out the tests, and correspondingly small associated flow features, seriously limits the accuracy and resolution with which the flow surrounding the test vehicle can be investigated. In addition, the rapid rate of growth of boundary layers at low Reynolds number conditions precludes the use of a test facility where the fluid moves with respect to the surrounding walls, as in the case of a wind or water tunnel, because the wall boundary layers prevent the development of a suitable velocity profile in the test section. It, therefore, becomes necessary to use an approach where the fluid is stationary with respect to the surrounding walls and the model is moved through it.

It is, therefore, desirable to provide a test apparatus or facility that overcomes the problems associated with the use of conventional apparatuses, particularly for testing at low Reynolds numbers.

SUMMARY OF THE INVENTION

It is an object of the present invention to obviate or mitigate the disadvantages of previously known methods and apparatuses for aerodynamic and hydrodynamic testing. It is a particular object to provide a method and apparatus that permits improved aerodynamic and hydrodynamic testing at low Reynolds numbers. In a first aspect, there is provided an apparatus for aerodynamic or hydrodynamic testing of a model. The apparatus comprises an enclosure for filling with a liquid, such as glycerine, of known properties, such as viscosity and density. The liquid can be a mixture of two or more liquids, such as water and glycerine. If liquid mixtures are used, a mixing unit can be provided that also controls the mixing ratio. The enclosure is covered such that the liquid is in full contact with all walls of the enclosure, thereby preventing the existence of a free surface. A mechanism is provided to impart movement to the model.

In a presently preferred embodiment of the apparatus of the present invention, the carriage that imparts the model motion is located above the enclosure. The enclosure's upper surface roof features a slit to allow passage of the model support strut. A seal installed along the full length of the slit ensures that the slit is normally closed yet it allows the motion of the strut by tightly surrounding it. This arrangement prevents the existence of a free surface in the vicinity of the strut as the model is pushed through the test medium. While it is contemplated that the seal can comprise a single inflatable member, it is presently preferred that the seal be formed by two cooperating inflatable seals arranged in face-to-face relation. To facilitate the displacement of air from within the enclosure by the liquid, the upper surface of the enclosure can be upwardly angled, to direct the liquid towards the seal, which for the purpose of filling the tank is opened, thus preventing the entrapment of air within the enclosure. In a further embodiment, the apparatus can include a track inside the enclosure to move the model, thereby obviating the need for a seal.

In a further aspect, there is provided a method for aerodynamic or hydrodynamic testing of a model in an enclosure filled with a liquid of known properties. The method comprises submerging the model in the test fluid which completely fills the enclosure such that the liquid has no free surface; and moving the model through the liquid in the enclosure to determine aerodynamic or hydrodynamic characteristics of the model and to investigate the flow around it. Preferably, the model is mounted on a strut extending through the seal. In this embodiment, moving the model includes moving the strut. Alternatively, the model can be moved model along on a track contained within the enclosure.

In yet another aspect, the present invention provides a seal for an aerodynamic or hydrodynamic test apparatus. The aerodynamic or hydrodynamic test apparatus includes a slit that provides a passage for a strut to impart movement to a model submerged in the test fluid within the enclosure. The seal comprises at least one inflatable member that can be inflated to a pressure sufficient to prevent the existence of an opening that leads to a free surface, while permitting the strut to move in the slot. In a presently preferred embodiment the seal has two cooperating inflatable members arranged in face-to-face relation.

Other aspects and features of the present invention will become apparent to those ordinarily skilled in the art upon review of the following description of specific embodiments of the invention, in conjunction with the accompanying figures.

BRIEF DESCRIPTION OF THE DRAWINGS

Embodiments of the present invention will now be described with reference to the attached drawings, in which.

DETAILED DESCRIPTION OF THE INVENTION

Generally, the present invention provides an apparatus, designed to conduct aerodynamic and hydrodynamic tests at very low Reynolds numbers, that addresses the problems encountered in conventional facilities when used under these conditions. The apparatus provides an enclosure for a test medium, which substantially eliminates any free surface between the medium and its surroundings, while permitting a model to move through the medium. The fluid contained in the tank is fully surrounded by and in contact with the walls, floor and roof, thereby substantially eliminating the possibility of a free surface. A method of using such an apparatus is also provided.

Preferably, the test medium is a mixture of two or more liquids where some have high viscosity and others have low viscosity, such that the viscosity of the test medium can be adjusted by changing the ratio between the components.

Figures 1A, 1B:
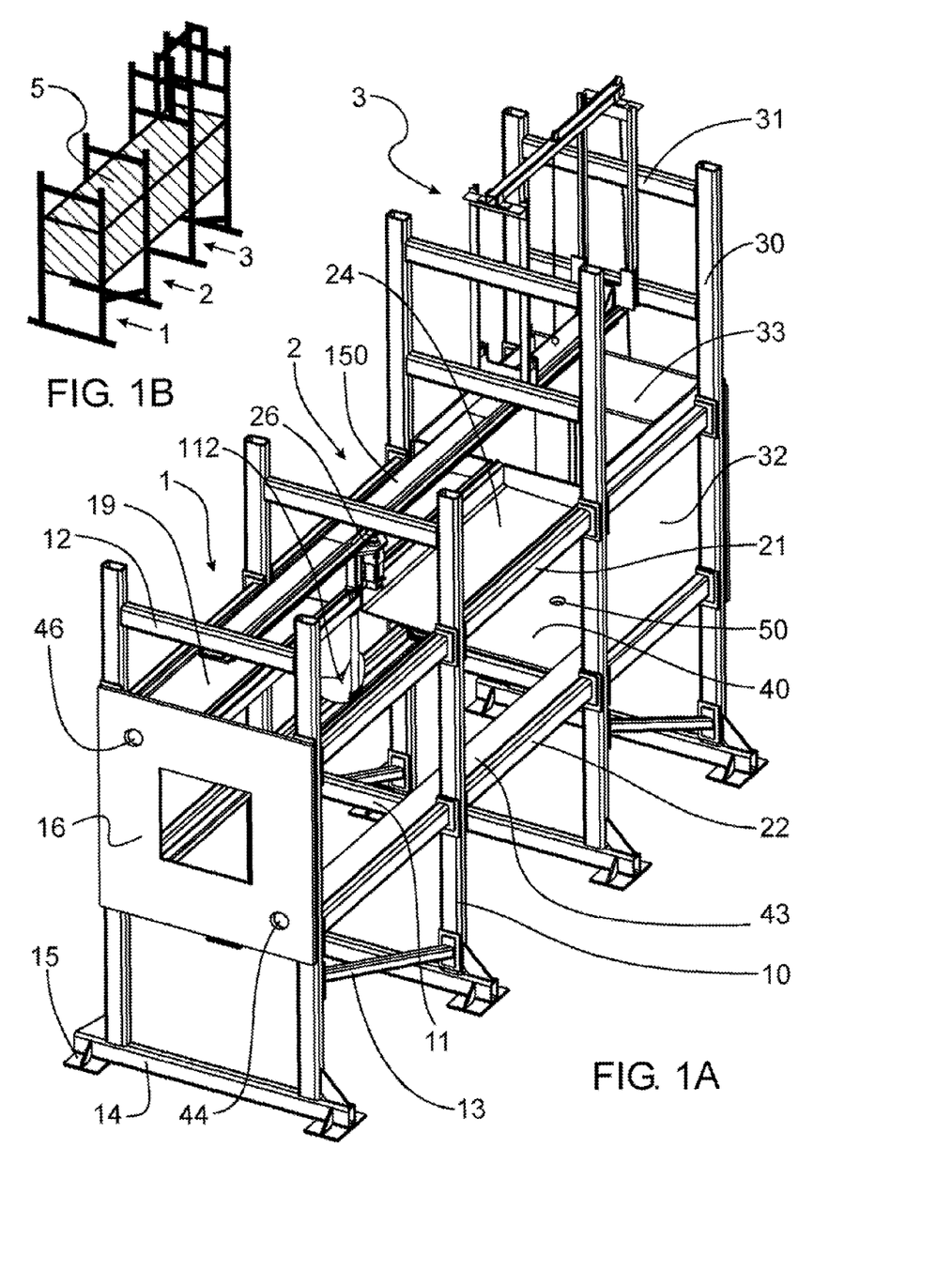
FIG. 1A is an elevated view of the first embodiment of the testing apparatus having one roof panel and the pivoting panel in the service module removed to show the interior features of the enclosure.
FIG. 1B is an elevated view of the first embodiment of the testing apparatus showing the volume occupied by the enclosure.

A first embodiment of the present invention is shown in FIGS. 1A, 1B, 2, 3A and 3B. Referring to FIGS. 1A and 1B, an elevated view of the apparatus, the device comprises three modules abutted and secured in sequence to form an enclosure 5 running through them. The first is an access module 3, for the insertion and removal of a model 112 into the enclosure 5. The second is one or more intermediate module(s) 2, which can vary in number in order to obtain testing facilities of different lengths for different requirements. The third is an end module 1. In a single device, these modules have the same width, but can vary in length. The current unit is shown having three modules (only one intermediate module). It is understood that more such modules can be added as needed.

The access module 3 has four posts 30, which extend over the enclosure 5 to permit the installation of pulleys and/or a motorized hoist, leaving enough room to insert or remove the model 112 in or out of the enclosure 5. The other modules have posts 10, arranged in pairs and joined by upper bars 12 that support a track 150 such that there is sufficient clearance for a carriage assembly 26 to move freely over the enclosure 5 and under the track 150. All the modules are built in the same fashion with lower bars 11 supporting the bottom part of the enclosure, and the upper bars 12 over the enclosure. The posts 30 of the access module 3 have also supplemental bars 31 over their upper bars 12 to support the model lifting equipment.

On each side of the modules there are upper 21 and lower 22 rectangular structural tube assemblies joining consecutive posts on the same side of the enclosure 5. Reinforcement bars 13 may be added, based on the weight of the enclosure and of the fluid filling it. The posts (10 or 30) can be directly fastened or attached to a fixed or mobile structure, and/or joined by a horizontal bar 14 to the corresponding post on the other side of the device. Leveling pads 15 are included under the structure to provide accurate height adjustment.

Figure 2:
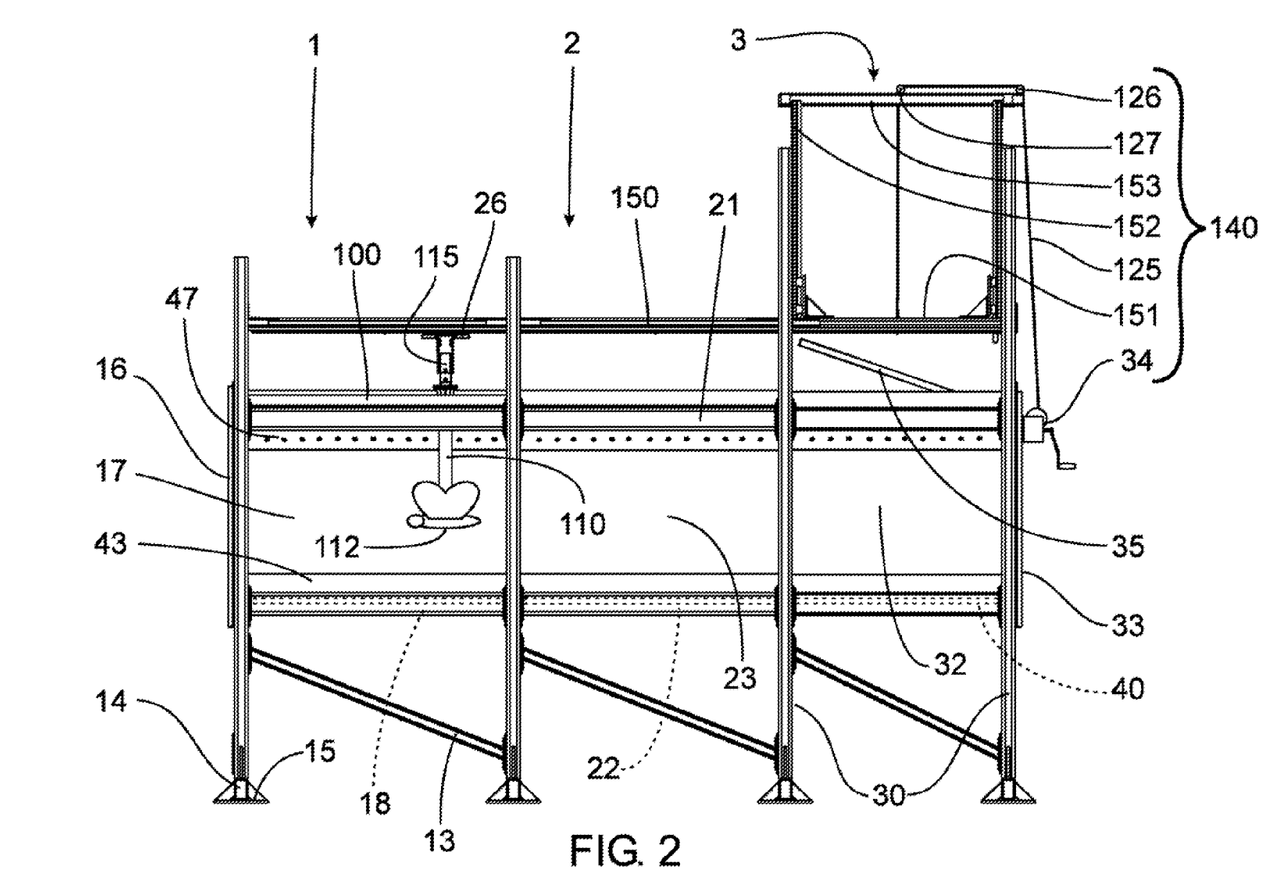
FIG. 2 is a side view of the first embodiment of the testing apparatus having one roof panel removed to show a side view of the seal.

Referring to FIG. 2, the side view of the facility, the enclosure 5 is defined by a series of panels comprising: paired panels on opposite sides of the enclosure (17, 23, 32), end panels (16, 33), floor panels (18, 22, 40) and roof panel pairs (19, 24 on FIG. 1A), access module roof 35, and seal assembly 100. The panels seal the apertures formed by two posts and two bars, or by four bars.

The panels 32, 33 and 40 in the access module 3 can be made of a non-transparent material such as aluminum, or a transparent material such as glass, Plexiglass™, etc. Should the back panels be made of a non-transparent material, they can have an observation window to visualize the loading and unloading operations of the model 112, and the movement of the model 112 in a test. The top part of the enclosure in the access module 3 can be closed by pivoting panel 35.

Panels 22, 23, in the intermediate module 2 can be made of glass, Plexiglass™ or any other suitable transparent material, to permit observation of the model from any angle. Panels 16, 17 and 18 in the end module 1 are also made of glass, Plexiglass™ or any other suitable transparent material. The end panel 16 can also be made of an opaque material and have an observation window to visualize the movement of the model in a test.

Referring to FIGS. 1A and 1B, the top part of the enclosure 5 in the intermediate module(s) 2 and the end module 1 is closed by two pairs of roof panels (24 and 19 respectively) and a seal assembly 100, which prevents any vertical motion of the fluid through the slit between the roof panels. Preferably, the roof panels 19 and 24 are slightly sloped up towards the seal assembly 100 to prevent air entrapment in the tank (angle □ on FIG. 3 and FIG. 5) On FIGS. 3A and 3B the panel slope is shown by the position of the upper row of screws 51 on the front panel 16. The seal assembly will be described in greater detail below.

Referring to FIG. 2, the loading module 3 has a hoisting assembly 140 to insert and remove the model in and out of the enclosure. This hoisting assembly 140 has four vertical guides 152 to keep a hoisting track 151 in alignment throughout the hoisting movements. The hoisting track 151 is an extension of the track 150, having the same cross-section. Two of the vertical guides 152 are attached to the upper bar 12 and the supplementary bar 31 on each side of the hoisting track 151. A pulley retainer 153 joins the four guides together at their high end. Pulleys (126 and 127) are attached to the pulley retainers 153, so that the movement of the hoisting track 151 can be imparted from the hoist 34 by means of a cable 125. The pulleys and hoist system can be replaced advantageously by a motorized hoist at the exact position of pulley 127.

Figure 3A:
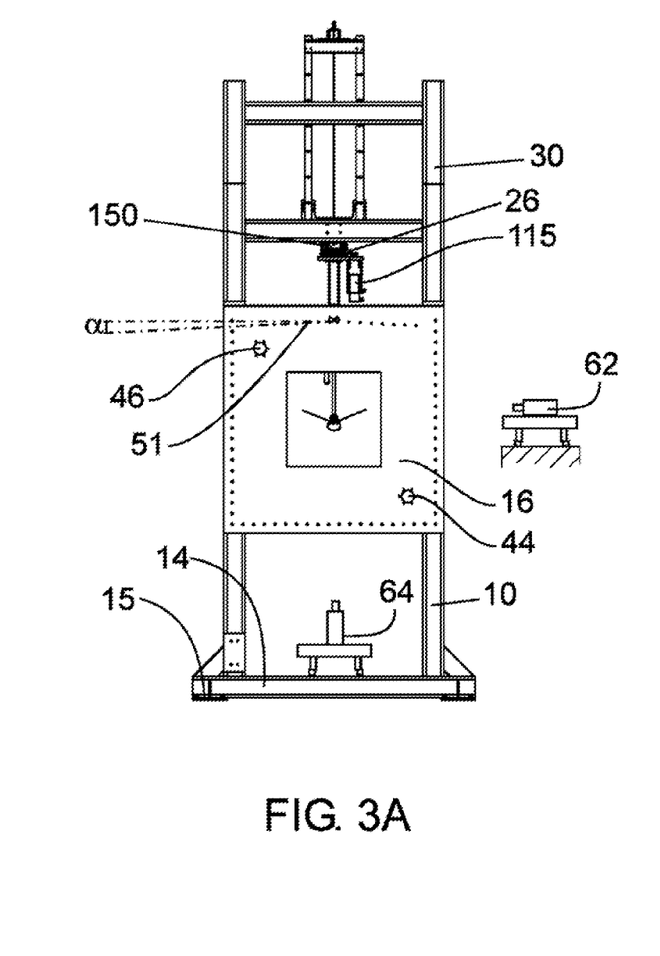
FIG. 3A is a front view of the first embodiment of the testing apparatus.
Figure 3B:
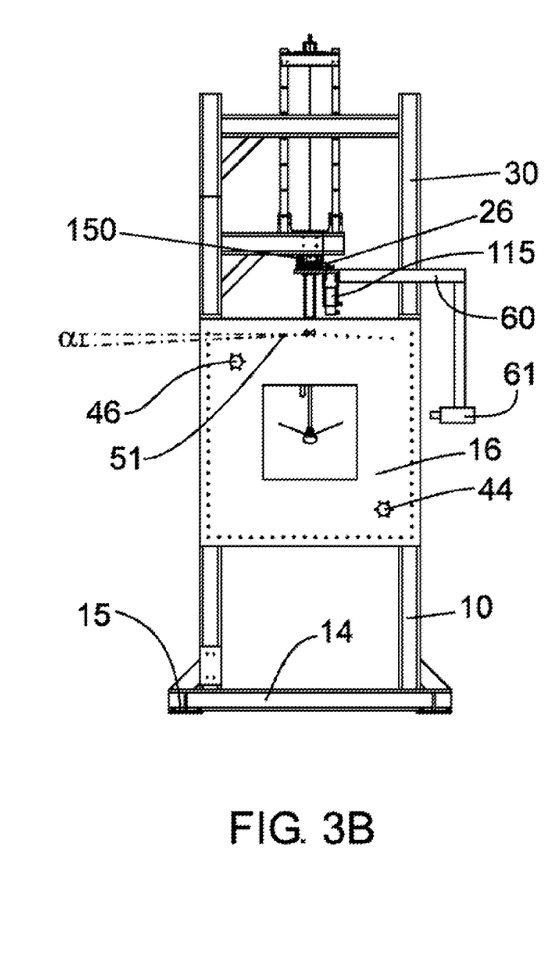
FIG. 3B is a front view of a variation of the first embodiment of the testing apparatus, where some of the elements of the structure are cantilevered to allow the mounting of observation equipment on the model carriage

Referring to FIGS. 3A and 3B, flow diagnostic equipment (61, 62, 64) may be installed on carriages mounted on tracks external to the tank either on separate carriages as shown in FIG. 3A (62, 64) or on the model carriage as shown in FIG. 3B (60, 61)

Referring to FIG. 2, two manifolds, 43 and 47, consisting of pipes that run along the length of the enclosure 5, with perforations along them facing the interior of the tank, are used to introduce and withdraw fluid into and out of the tank. These pipes are connected to a system which the user can use to control the ratio of low viscosity to high viscosity liquid, depending on the desired viscosity of the test medium. The manifolds can also be used to create a cross flow in the enclosure that displaces dyes or other trace materials left after flow diagnostics tests, such that the central part of the enclosure remains clear for additional testing. Pouring the fluid in the access module 3 when the pivoting panel 35 is opened may also fill the enclosure 5. The fluid can be forced to circulate through the enclosure 5 by means of a closed circuit pumping loop connected to ports 44 and 46 (FIG. 1A).

Figure 4:
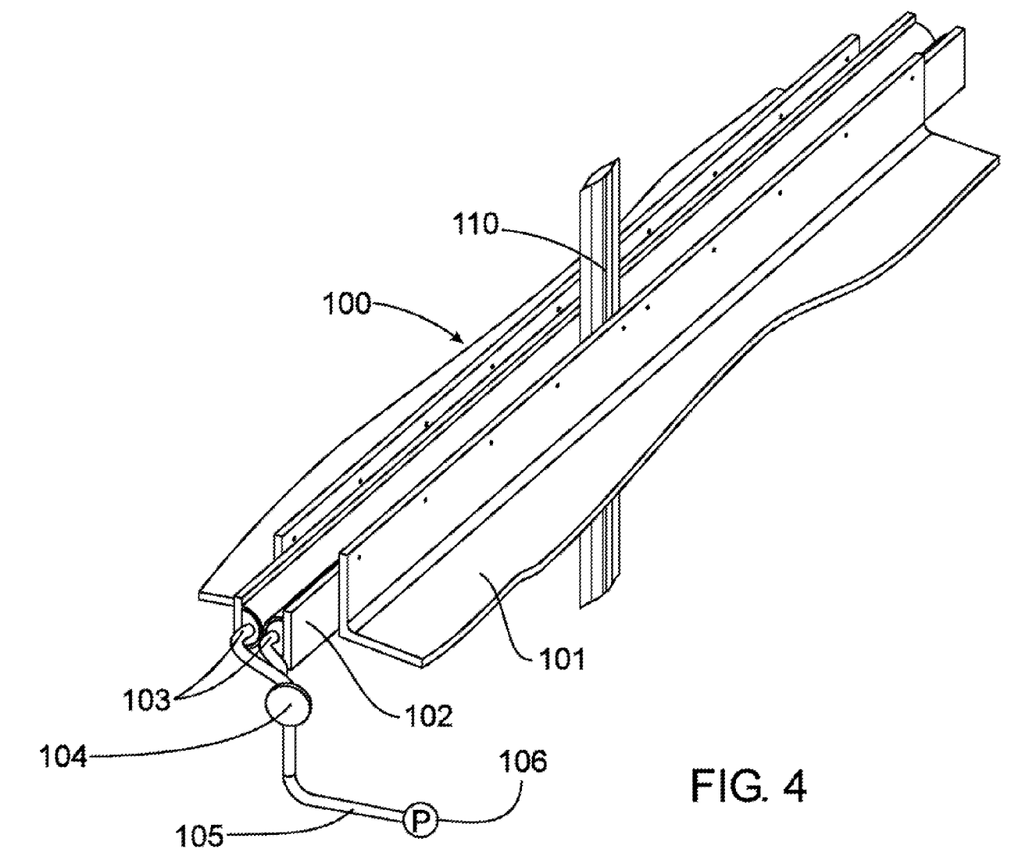
FIG. 4 is an elevated view of the seal and associated model support strut, as used in the first embodiment.
Figure 7:
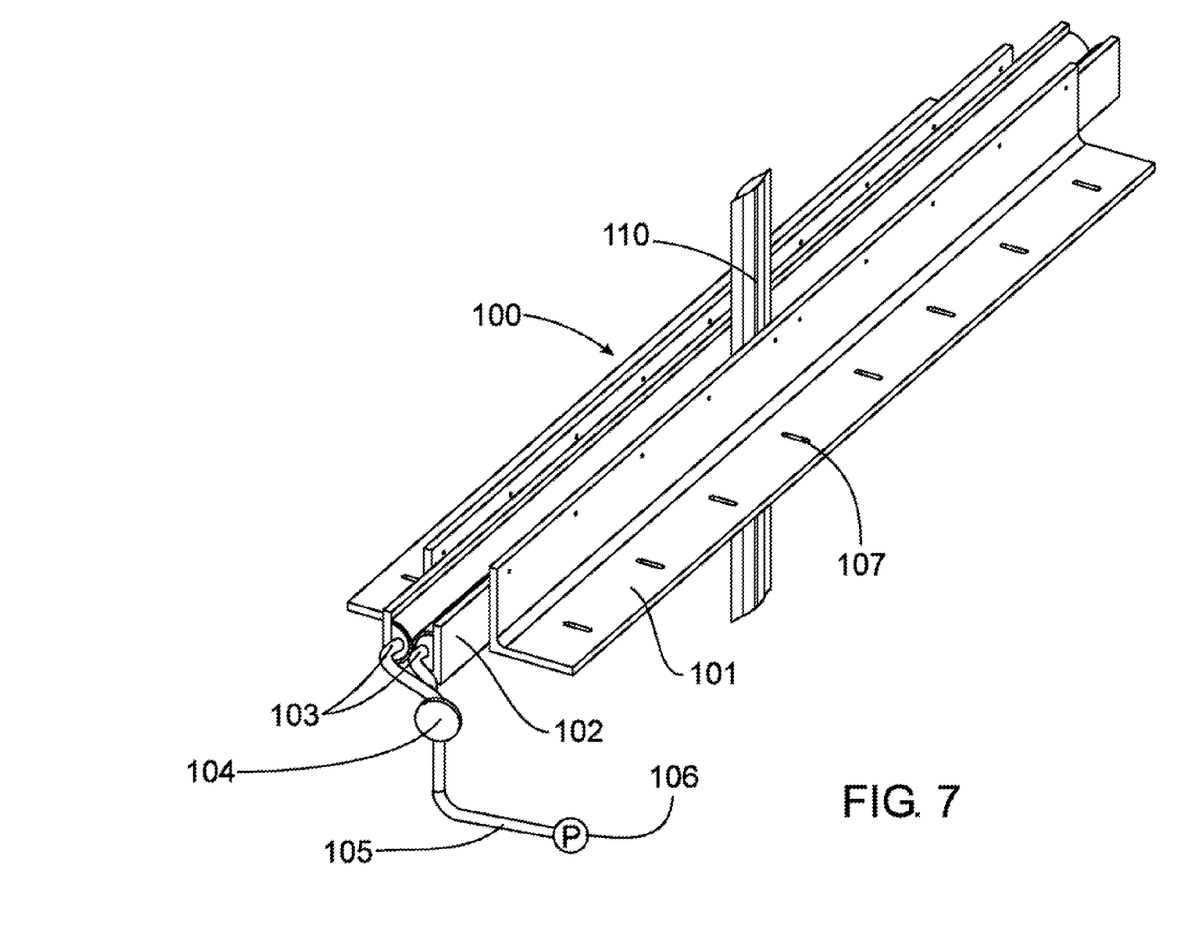
FIG. 7 is an elevated view of the seal, as an independent unit, and associated model support strut.

Referring to FIGS. 4 and 7, the primary seal assembly 100 prevents leakage of the fluid through the enclosure roof, but permits the model support strut 110 to translate along the slit. The primary seal assembly includes mounting elements 101 that can be an integral part of the roof panels (FIG. 4) or separate units attached thereto (FIG. 7), and a suitably shaped inflatable seal 102. The mounting elements 101 are separated by a constant gap. The inflatable seals 102 can be glued to the mounting elements 101, or attached to the latter by means of "L"-shaped brackets 109, or any suitable means permitting the eventual replacement of worn-out seals. The inflatable member 102 is closed at one end and connected to a suitable air supply through a tube 103 at the other end.

Figure 5:
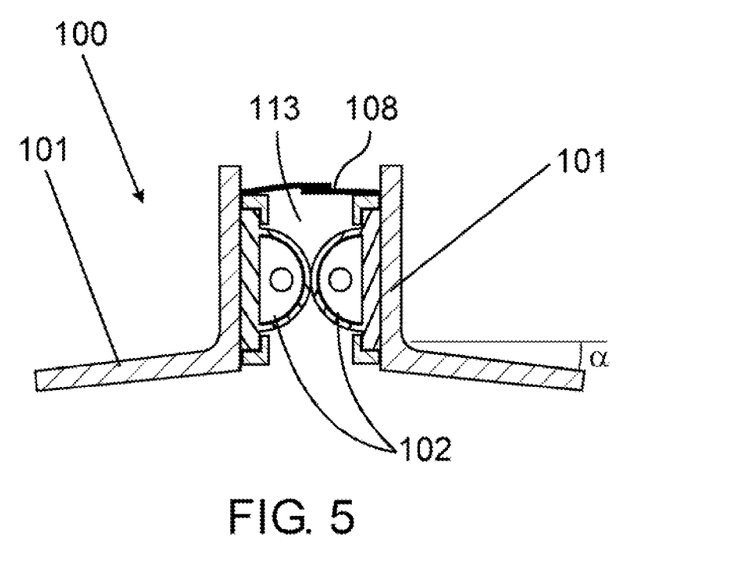
FIG. 5 is a section view of the seal without the strut in place.
Figure 6:
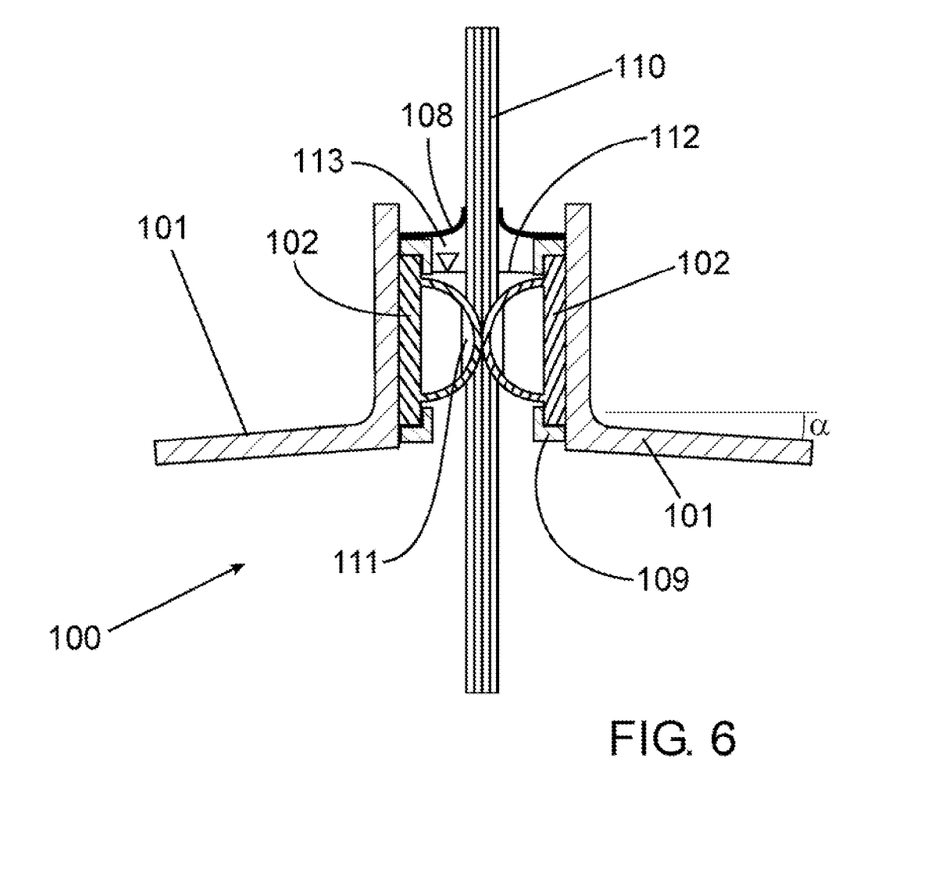
FIG. 6 is a section view of the seal with the strut in place.

Referring to FIGS. 5 and 6, the inflatable primary seals 102 on each side of the seal assembly are arranged in face-to-face configuration. These inflatable seals are close together, but not necessarily in contact when no pressure is applied. When pressure is applied, the inflatable seals are first in tangential contact, and by increasing the pressure, the surface of contact can be augmented. Higher pressure results in better sealing, while lower pressure results in easier movement of the strut 110. The use of a lubricant permits the operation of the seal at a higher pressure. For this reason, the inflatable seals are preferably slightly immersed in the test fluid to keep them well lubricated. Even immersed, the seal assembly blocks the escape of the fluid, by the contact between the inflatable seals. Also, the inflatable seals, by virtue of their elasticity, conform to the contour of the strut 110 as it moves along the roof slit. Very small local gaps may be present at the leading and trailing edges of the strut 110, but the high viscosity of the fluid renders any flow through them essentially negligible. A secondary seal 108, located above the primary seal 102, consists of two overlapping flexible strips mounted on brackets 109. This secondary seal 108 permits the translation of the model support strut through the roof slit, and is used to keep dust away from the small amount of fluid above the primary seal needed for lubrication as discussed above. The presence of the secondary seal 108 also produces a small-elongated chamber 113 defined by this seal at the top, the fluid level at the bottom and brackets 109 on the sides. If a hygroscopic test fluid such as glycerine is used, this chamber can be kept slightly pressurized with dry air to minimize the absorption of water by the fluid.

Referring to FIG. 4, any suitable source 106 of air can be used to operate the inflatable seal 102. From this source, a control unit 104 can, automatically or manually, maintain the desired operating pressure. A single tube 105 may be connected from the source 106 to the control unit 104, and their respective tube 103 feeds each inflatable seal 102 of the seal assembly 100 from the control unit 104.

Figure 8:
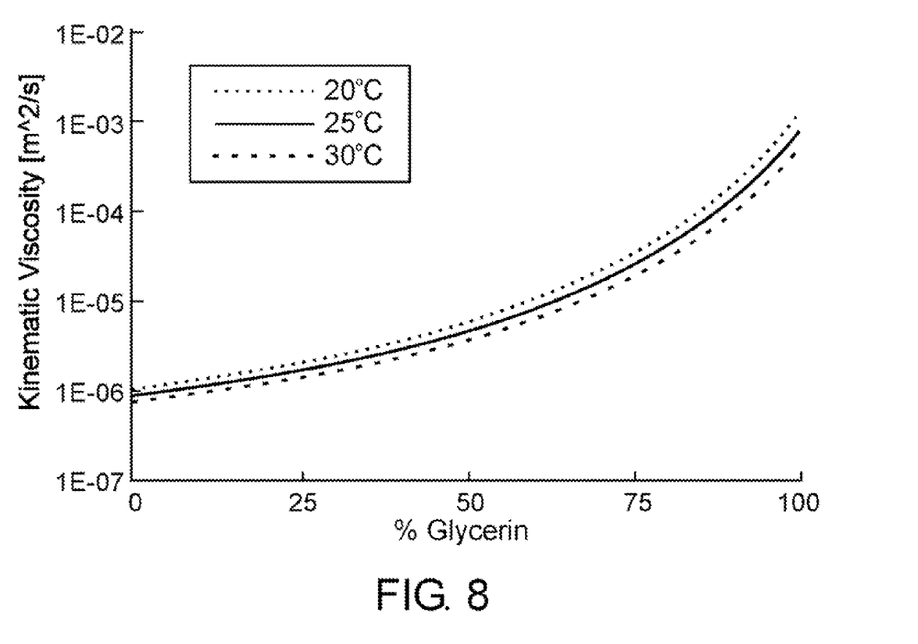
FIG. 8 is a curve of the test medium kinematic viscosity as a function of glycerine concentration (in water)
Figure 9:
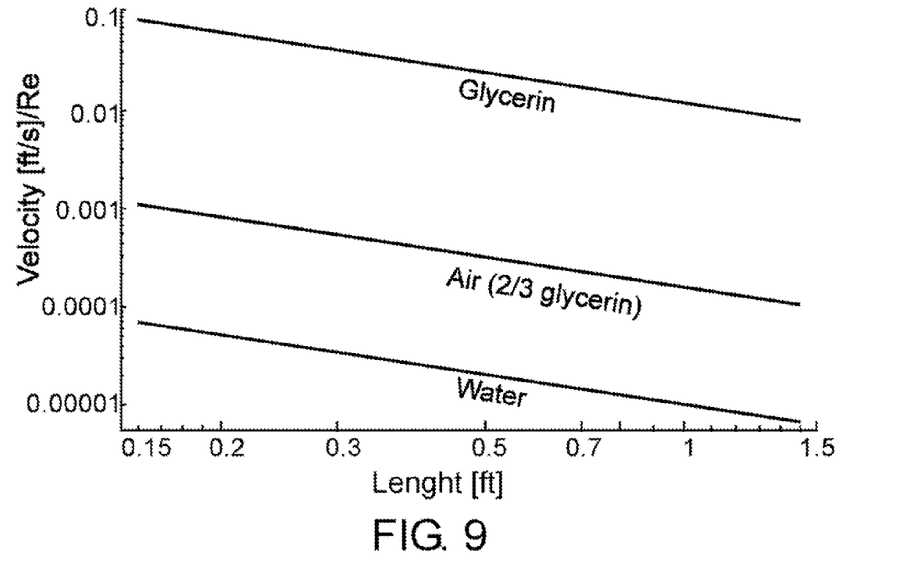
FIG. 9 is a graph that shows the model velocity needed to obtain a given Reynolds number for a given model size and test medium composition
Figure 10:
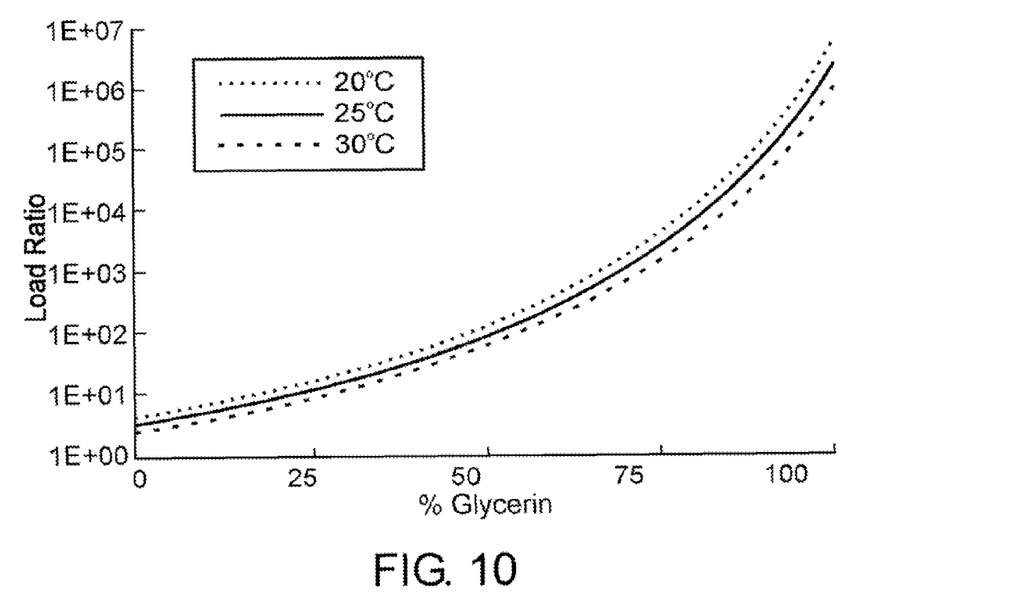
FIG. 10 shows the ratio between aerodynamic loads in a glycerine solution and in air acting on the model at a given Reynolds number.

Given the definition of the Reynolds number (Re=Vl/v, where V=velocity, l=reference length, and v=kinematic viscosity of the fluid), in order to obtain a given value of Re the higher the fluid kinematic viscosity, the larger the model can be for a given velocity, and the higher the velocity can be for a given model size. Thus super-scale models can be used by virtue of a high kinematic viscosity test medium which permits magnification of the flow features for more detailed study. Various high viscosity fluids can be used, so long as they satisfy the necessary Newtonian characteristics. By changing the concentration of a solution of a high viscosity fluid in a low viscosity one, it is possible to vary the kinematic viscosity continuously. Referring to FIG. 8, as an example, glycerine can be used as the high viscosity liquid, and water as the low viscosity component. Such a solution allows a continuous change in kinematic viscosity over three orders of magnitude, from that of pure water (~1.0E-6 $m^2$/s) to that of pure glycerine (~1.0E-3 $m^2$/s). The use of this type of fluid allows the experimenter to adjust the viscosity of the test medium over a significant range on either side of the kinematic viscosity of air (approximately corresponding to that of a ⅔ solution of glycerine) (FIG. 9), providing the ability to test over a vast range of Reynolds number. The use of a high viscosity fluid also allows the speed of the model to be increased, which together with the high fluid density, compared to air, leads to a large gain in dynamic pressure, and therefore increases the generated loads for a given Reynolds number. Thus, the use of a fluid of high kinematic viscosity and density addresses the experimental problems associated with measuring extremely small loads at low Reynolds numbers.

Figure 11:
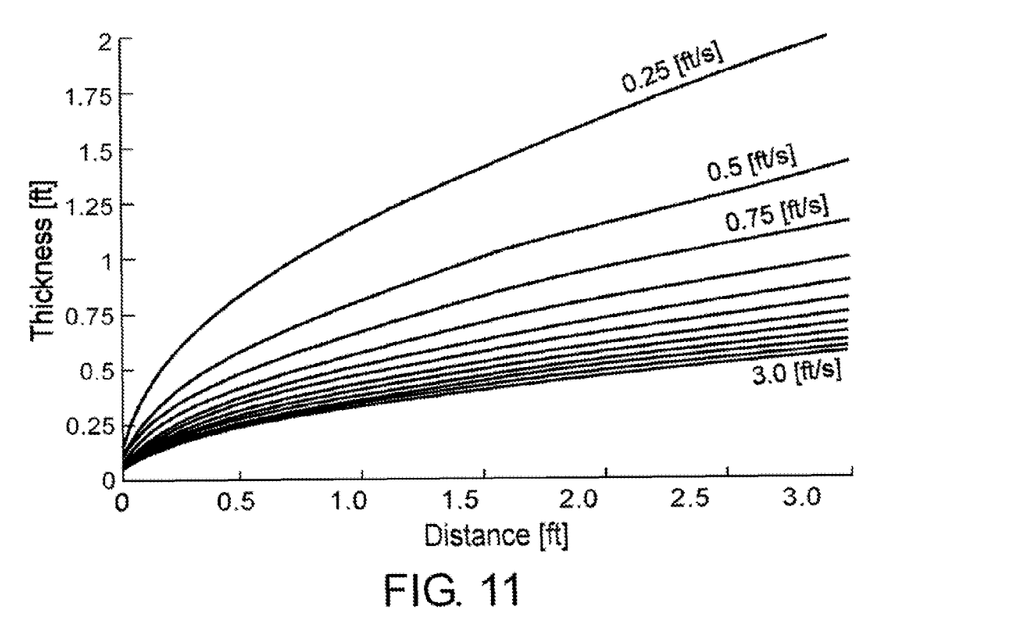
FIG. 11 shows the boundary layer growth as a function of distance and flow velocity in pure glycerine.

Low Reynolds number flows are characterized by a very rapid boundary layer growth. FIG. 11 depicts the laminar boundary layer thickness as a function of distance for various free stream velocities for pure glycerine. (FIG. 11) Given the fast boundary layer growth and its dependence on Reynolds number, it renders boundary layer suction impractical and thus largely precludes the use of an apparatus where the fluid moves with respect to the walls, such as in a wind tunnel. Therefore, for very low Reynolds numbers, it is preferable for the fluid to be stationary with respect to the walls of the tank.

In operation the enclosure is filled in advance such that the liquid completely fills it up to, and including the seal 100. As shown in FIG. 6, the slope of the enclosure roof panels prevents the trapping of any air bubbles within the enclosure 5. Sufficient liquid is introduced into the enclosure to reach a level just above the inflatable members 102. This ensures that the enclosure is completely free of air, and provides lubrication to the strut-seal interface. The model 112 is rigidly attached to the bottom end of strut 110, which is attached at its upper end to carriage 26. The carriage 26 is moved by a motor 115, which can be remotely controlled to produce an arbitrary velocity profile. A system of rack and pinion or a friction wheel on a high friction band are suitable to transform the rotary motion of the motor into a linear motion of the carriage, and for speed reduction. A second motor or a transmission system using the carriage motor 115 can be used through a shaft inside the strut 110 to impart movement, such as wing flapping, to the model 112.

Figure 12:
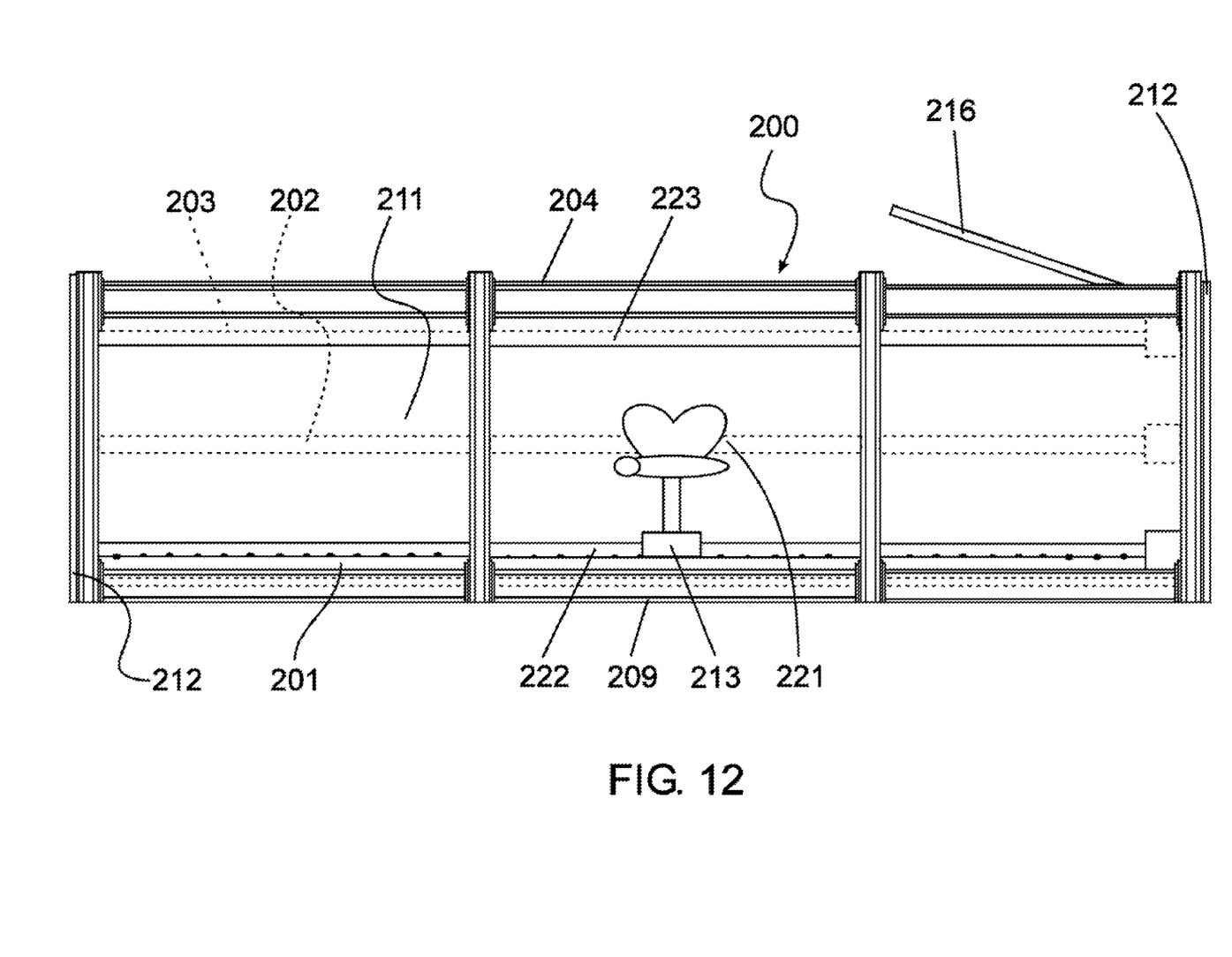
FIG. 12 is a side view of the second embodiment of the testing apparatus.

In a second embodiment, shown on FIG. 12, the enclosure 200 is fully closed by a bottom panel 209, a roof panel 213, side panels 211 and end panels 212. At least one track (201, 202, 203) is submerged in the enclosure 200. The track can be attached to the bottom 209, to the roof 204 (track 203), or the side 211 (track 202) of the tank. A carriage 213 imparts the necessary motion to the model via a suitable support strut. This enables the user to move the model 221 through the test medium without any external moving parts. In such a case, the panel of the roof 204 of the tank, can be identical to the other panels of the facility. A service panel 216 provides access to the model 221 and to the serviceable parts of the tracks and carriage. When the service panel 216 is closed, the facility creates a completely enclosed channel, with no free surfaces. The simple structure used in this second embodiment, with no additional structural support extending past the bottom panels of the tank, is also applicable to the first embodiment, as is the additional structure of the first embodiment applicable to this embodiment.

Figure 13:
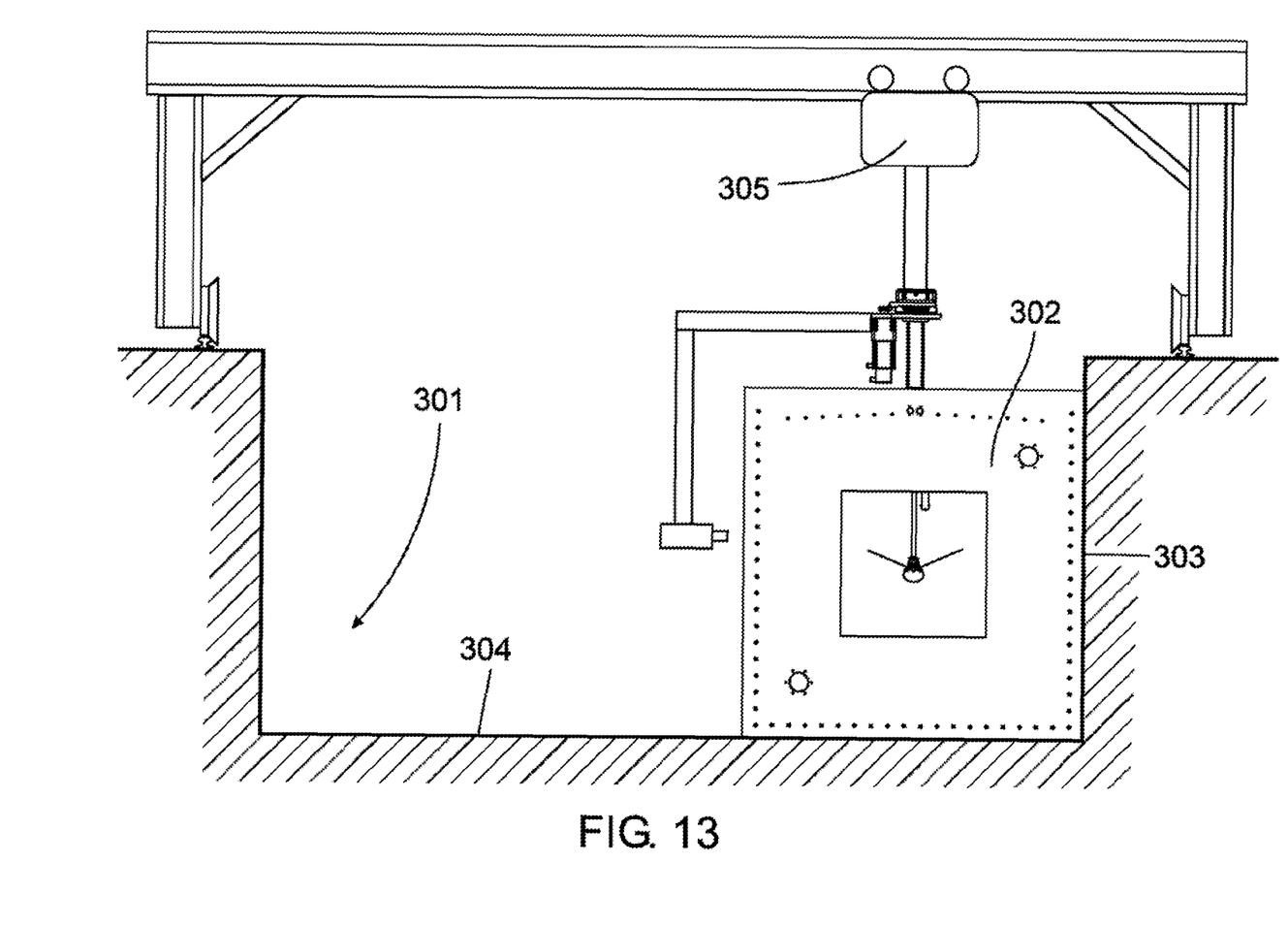
FIG. 13 is a front view of the third embodiment of the testing apparatus, which is constructed from an existing tow tank that has been reused to create a tank, but without the structure of the first and second embodiments.

In a third embodiment (FIG. 13), a large channel 301, such as a conventional towing tank, can be adapted to use an overhead crane or gantry 305 to impart some or all movements to the model. In this case one or two of the enclosure surfaces can be provided by the wall and bottom of the tow tank. Similarly, some other substitution to the proposed stand-alone version can be sought without departing from the scope of the invention.

It is understood that the present invention is not limited to the sole embodiments described above, but encompasses any and all embodiments within the scope of the following claims.

What is claimed is:

1. An apparatus for aerodynamic or hydrodynamic testing of a model, comprising:
   an enclosure for filling with a liquid of known properties, the enclosure having means for eliminating all air from the enclosure, such that the liquid is in full contact with the walls of the enclosure, thereby removing any free surface; and
   a mechanism to impart movement to the model such that the model is moved through the liquid and the enclosure, the liquid being substantially stationary with respect to the walls of the enclosure.

2. The apparatus of claim 1, wherein the known liquid properties are selected from viscosity and density.

3. The apparatus of claim 1, wherein the liquid includes glycerine.

4. The apparatus of claim 1, wherein the liquid includes a plurality of liquids mixed in order to obtain the known properties.

5. The apparatus of claim 4, further comprising a unit to control the mixing ratio of the liquid components.

6. The apparatus of claim 1, wherein the means for eliminating the air includes a slit at the upper surface of the enclosure, with a seal being disposed in the slit, and wherein the mechanism to impart movement to the model includes a strut passing through the slit.

7. The apparatus of claim 6, wherein the seal includes at least one inflatable member.

8. The apparatus of claim 7, wherein the seal is formed by two cooperating inflatable seals arranged in face-to-face relation.

9. The apparatus of claim 8, wherein the seal further comprises a secondary seal formed by two cooperating strips arranged in face-to-face relation.

10. The apparatus of claim 1, wherein the mechanism to impart movement to the model includes a track inside the enclosure.

11. The apparatus of claim 1, wherein the means for eliminating the air includes an upper surface of the enclosure upwardly angled to direct the liquid towards the seal, and to prevent the entrapment of air in the enclosure.

12. A method for aerodynamic or hydrodynamic testing of a model, comprising:
   filling an enclosure with a liquid of known properties, and eliminating air from the enclosure such that the liquid has no free surface;

submerging the model in the liquid;

moving the model through the liquid in the enclosure, the liquid being substantially stationary with respect to the walls of the enclosure, to determine aerodynamic or hydrodynamic characteristics properties of the model and to diagnose the flow around it.

13. The method of claim 12, wherein the step of eliminating air from the enclosure includes providing a seal in a slit on an upper surface of the enclosure.

14. The method of claim 13, wherein the model is mounted on a strut extending through the seal, and moving the model includes moving the strut.

15. The method of claim 12, wherein the model is moved by means of a carriage moving on a track contained within the enclosure.

16. A seal for an aerodynamic or hydrodynamic test apparatus, the aerodynamic or hydrodynamic test apparatus including a slit forming a passage for a strut to impart movement to a model submerged in an enclosure in the apparatus, comprising:

at least one inflatable member for releasable attachment within the slit, with at least one inflatable member being inflated to a pressure sufficient to prevent the existence of a free surface, while permitting the strut to move in the slit.

17. The seal of claim 16, wherein the seal has two cooperating inflatable members arranged in face-to-face relation.

18. The seal of claim 17, seal further comprises a secondary seal formed by two cooperating strips arranged in face-to-face relation.

* * * * *